United States Patent
Sato

(10) Patent No.: US 9,686,436 B2
(45) Date of Patent: Jun. 20, 2017

(54) DATA RECORDING APPARATUS AND CONTROL METHOD THEREOF

(71) Applicant: CANON KABUSHIKI KAISHA, Tokyo (JP)

(72) Inventor: Mayu Sato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/967,864

(22) Filed: Dec. 14, 2015

(65) Prior Publication Data

US 2016/0179424 A1    Jun. 23, 2016

(30) Foreign Application Priority Data

Dec. 22, 2014 (JP) .................................. 2014-259278

(51) Int. Cl.
| | |
|---|---|
| *H04N 5/76* | (2006.01) |
| *H04N 1/21* | (2006.01) |
| *H04N 5/77* | (2006.01) |
| *H04N 5/907* | (2006.01) |
| *G06F 3/06* | (2006.01) |

(52) U.S. Cl.
CPC ......... *H04N 1/2158* (2013.01); *G06F 3/0623* (2013.01); *G06F 3/0661* (2013.01); *G06F 3/0679* (2013.01); *H04N 5/772* (2013.01); *H04N 5/907* (2013.01)

(58) Field of Classification Search
CPC ...... H04N 1/2158; H04N 5/907; H04N 5/772; G06F 3/0623; G06F 3/0661; G06F 3/0679

USPC ................................ 348/231.99, 231.1–231.9
See application file for complete search history.

(56) References Cited

U.S. PATENT DOCUMENTS

| | | | |
|---|---|---|---|
| 8,225,010 B2 * | 7/2012 | Tsujii | G06F 13/385 396/310 |
| 8,386,691 B1 * | 2/2013 | Chau | G06F 13/4022 710/305 |

FOREIGN PATENT DOCUMENTS

JP        2011-128910 A      6/2011

* cited by examiner

*Primary Examiner* — Yogesh Aggarwal
(74) *Attorney, Agent, or Firm* — Cowan, Liebowitz & Latman, P.C.

(57) ABSTRACT

A data recording apparatus in which a recording medium is attachable, comprises a detection unit which detects whether or not an attached recording medium is a predetermined recording medium having a wireless communications function; a determination unit which determines whether or not, when the attached recording medium is the predetermined recording medium, there is a settings information file; and a control unit which generates, when determined that the settings information file is not present, a predetermined settings information file in the predetermined recording medium. The predetermined recording medium has a function of generating a settings information file, and when generating a settings information file in response to an instruction from the external apparatus, the predetermined recording medium is in a write protect state where writing from the data recording apparatus is inhibited.

8 Claims, 9 Drawing Sheets

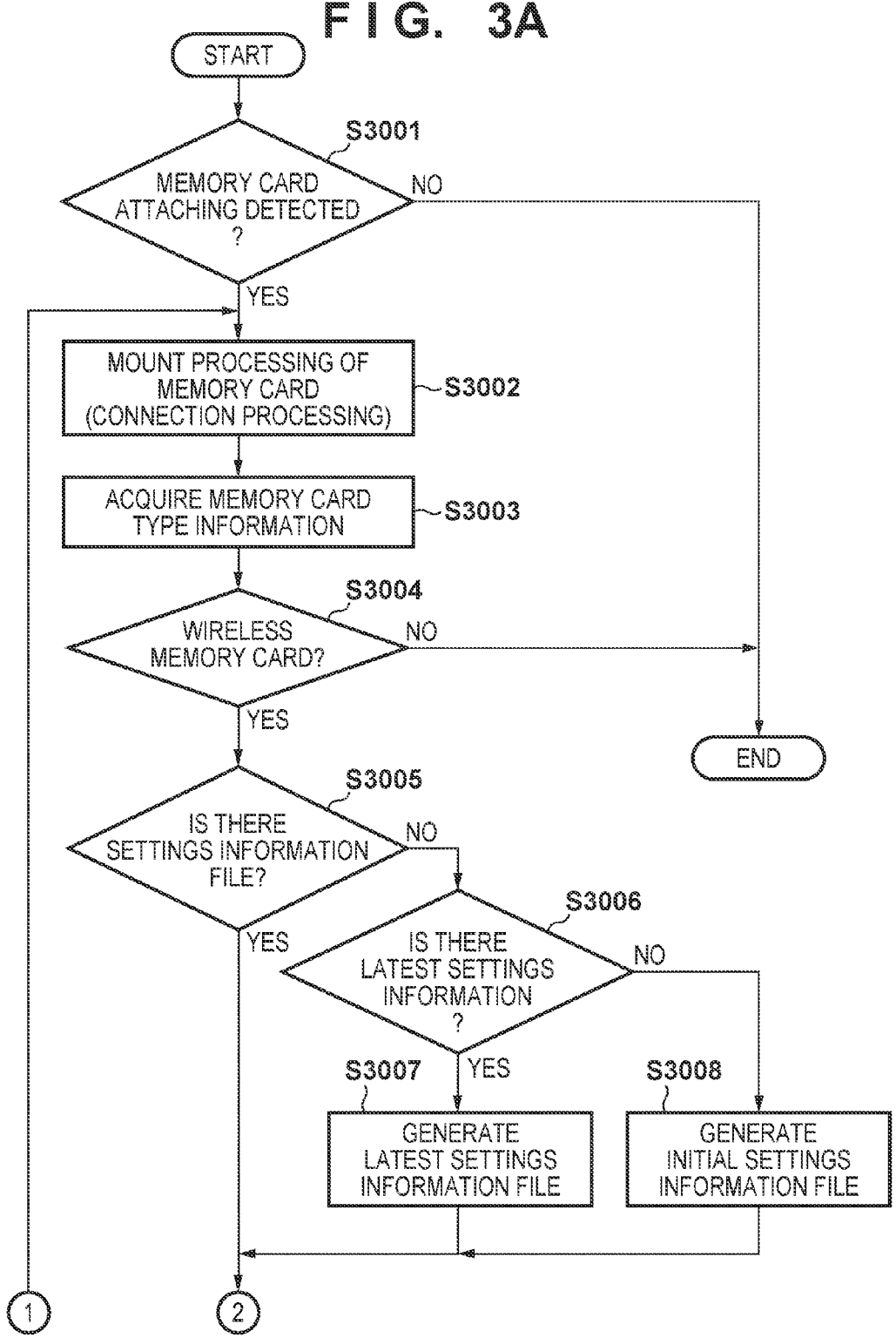

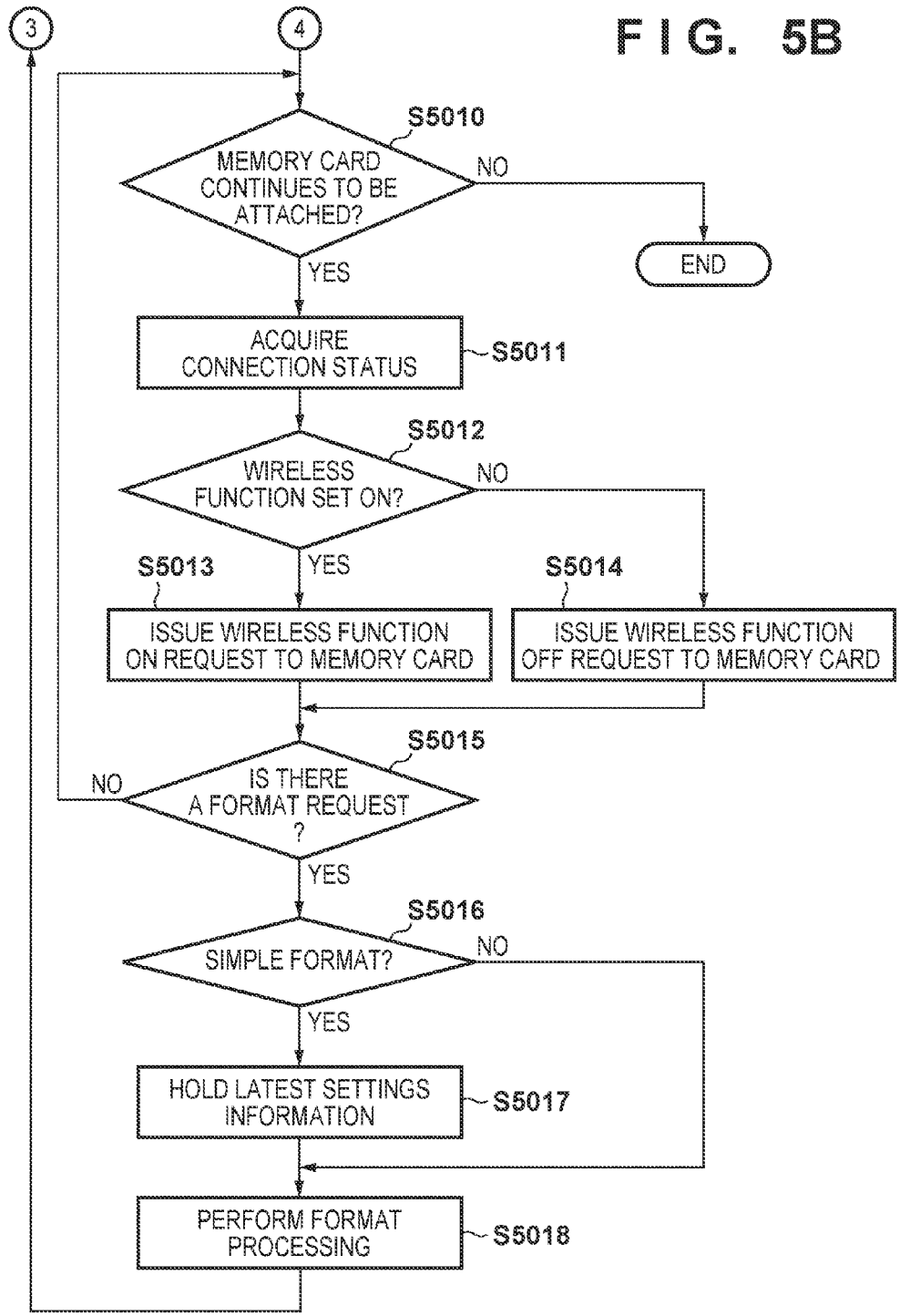

DATA RECORDING APPARATUS AND CONTROL METHOD THEREOF

BACKGROUND OF THE INVENTION

Field of the Invention

The present invention relates to a data recording apparatus in which a recording medium is attachable.

Description of the Related Art

A memory card (wireless memory card) that ordinarily has a wireless communications function is known as a recording medium of a digital camera (Japanese Patent Laid-Open No. 2011-128910). Among wireless memory cards, there is also a memory card that is booted as an access point, opens a file that was recorded to a memory area via wireless communications with an external apparatus that has been connected, and transfers the file in response to a request from the external apparatus.

Such a wireless memory card often holds in its own memory area a settings information file where settings information for wireless communications has been written, and there are also wireless memory cards that have a function of generating a settings information file in response to an instruction from an external apparatus that has been wirelessly connected.

Incidentally, with the above-described conventional wireless memory cards, it is conceivable that while generating the settings information file in response to an instruction of the external apparatus, a write protect state is established in which writing from the host apparatus to the memory card is inhibited. In this case, it is possible that writing of data to the wireless memory card will become impossible at a time unintended by a user of the device where the wireless memory card has been attached, and so processing will be interrupted. For example, in a case where the wireless memory card has been attached in a digital camera, if an instruction to generate a settings information file is received from the external apparatus and so a write protect state is established in which writing from the host apparatus is inhibited at a time unintended by a photographer, there is a possibility that shooting processing will be interrupted contrary to the intentions of the photographer.

SUMMARY OF THE INVENTION

The present invention provides a data recording apparatus in which a recording medium is attachable, comprising: a detection unit configured to detect whether or not an attached recording medium is a predetermined recording medium having a wireless communications function; a determination unit configured to determine whether or not, when the attached recording medium is the predetermined recording medium, there is a settings information file where predetermined settings information is written in the predetermined recording medium; and a control unit configured to generate, when determined that the settings information file is not present, a predetermined settings information file in the predetermined recording medium, wherein the predetermined recording medium has a function of generating a settings information file in response to an instruction received wirelessly from an external apparatus, and when generating a settings information file in response to an instruction from the external apparatus, the predetermined recording medium is in a write protect state where writing from the data recording apparatus is inhibited.

The present invention provides a control method of a data recording apparatus in which a recording medium is attachable, comprising: detecting whether or not an attached recording medium is a predetermined recording medium having a wireless communications function; determining whether or not, when the attached recording medium is the predetermined recording medium, there is a settings information file where predetermined settings information is written in the is the predetermined recording medium; and generating, when determined that the settings information file is not present, a predetermined settings information file in the predetermined recording medium, wherein the predetermined recording medium has a function of generating a settings information file in response to an instruction received wirelessly from an external apparatus, and when generating a settings information file in response to an instruction from the external apparatus, the predetermined recording medium is in a write protect state where writing from the data recording apparatus is inhibited.

The present invention provides a computer-readable storage medium storing a program for causing a computer to execute a control method of a data recording apparatus in which a recording medium is attachable, comprising: detecting whether or not an attached recording medium is a predetermined recording medium having a wireless communications function; determining whether or not, when the attached recording medium is the predetermined recording medium, there is a settings information file where predetermined settings information is written in the is the predetermined recording medium; and generating, when determined that the settings information file is not present, a predetermined settings information file in the predetermined recording medium, wherein the predetermined recording medium has a function of generating a settings information file in response to an instruction received wirelessly from an external apparatus, and when generating a settings information file in response to an instruction from the external apparatus, the predetermined recording medium is in a write protect state where writing from the data recording apparatus is inhibited.

Further features of the present invention will become apparent from the following description of exemplary embodiments (with reference to the attached drawings).

BRIEF DESCRIPTION OF THE DRAWINGS

FIGS. 3A and 3B are flowcharts that show processing when a memory card is attached in a second embodiment.

FIGS. 5A and 5B are flowcharts that show processing when a memory card is attached in a third embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Following is a description of an embodiment in which a data recording apparatus of the present invention is applied to a digital camera having a card slot where a memory card is attachable. Note that the present invention is not limited to this embodiment, and is broadly applicable to apparatuses that have a memory card slot.

<Apparatus Configuration>

Figure 1:
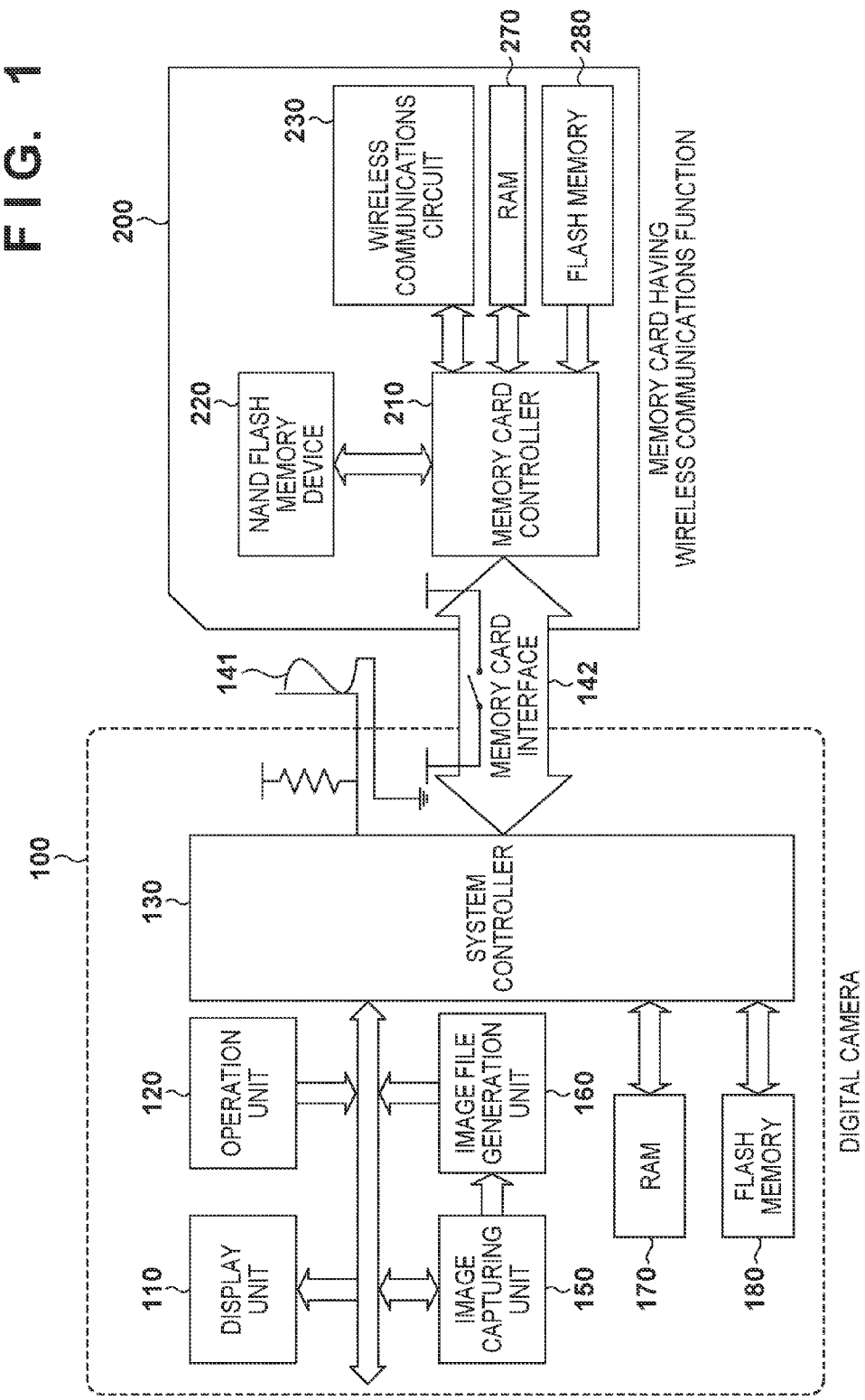
FIG. 1 is a block diagram that shows an apparatus configuration of the present embodiment.

First is a description of the configuration and functions of the digital camera of the present embodiment, with reference to FIG. 1.

In FIG. 1, a digital camera 100 has a card slot, and a recording medium such as a memory card (referred to below as a 'wireless memory card') 200 or the like that has a wireless communications function is attachable in the card slot. Note that while FIG. 1 shows a mode in which the wireless memory card 200 has been attached in the card slot of the digital camera 100, an ordinary memory card that does not have a wireless communications function is also attachable in the card slot.

A system controller 130 is an MPU (microprocessor), and includes a processor core, and peripheral circuits such as an I/O general-purpose port and an A/D converter. A RAM (volatile memory) 170 that is a primary storage apparatus that temporarily holds control parameters, image data, and the like is connected to the system controller 130. Also, a flash memory (non-volatile memory) 180 that is a secondary storage apparatus where a control program or the like of the digital camera 100 has been stored is connected to the system controller 130. The system controller 130 controls functions of the parts of the digital camera 100 by developing a control program that has been read out from the flash memory 180 in the RAM 170, and executing that program. Thus, the system controller 130 functions as a detection unit, a determination unit, a control unit, a format processing unit, a selection unit, a switching unit, and a recording unit according to the present invention.

Control of the digital camera 100 may be performed by a single hardware unit such as the system controller 130, or a plurality of hardware units may share processing to perform control of the apparatus as a whole.

An image file generation unit 160 encodes image data that has been captured by an image capturing unit 150 and generates an image file. The system controller 130 writes the image file that was generated by the image file generation unit 160 to the wireless memory card 200 via a memory card interface 142. Access to the memory card that has been attached in the card slot is performed via the memory card interface 142. Also, a card detection switch 141 for detecting that a card has been attached in the card slot is provided. The memory card interface 142 and the card detection switch 141 are connected to the system controller 130, and the system controller 130 is capable of controlling the memory card interface 142 based on output of the card detection switch 141.

The memory card interface 142 is capable of inputting/outputting signals to/from the wireless memory card 200 at prescribed times. Also, the memory card interface 142 is capable of controlling the on/off state of power supply to the wireless memory card 200. With the card detection switch 141, when the wireless memory card 200 is attached in the card slot of the digital camera 100, the card detection switch 141 is switched on. Thus, the system controller 130 is capable of detecting that a memory card has been attached in the card slot. The system controller 130 is capable of transmitting a command to acquire information related to the wireless memory card 200 to a memory card controller 210 of the wireless memory card 200. Also, the system controller 130 is capable of determining the card type from the information received from the memory card controller 210. A display unit 110 is used in order to display various information, such as display of system information, display of a playback image of an image that has been recorded, display of a menu related to settings for the wireless communications function, and so forth. Via an operation unit 120, the user inputs various operations to issue commands to the system controller 130.

Next is a description of the configuration and functions of the wireless memory card 200, which is a memory card having a wireless communications function and that has been attached in the card slot.

The memory card controller 210 is an MPU (microprocessor). Connected to the memory card controller 210 are a RAM 270 that is a primary storage apparatus, a flash memory 280 that is a secondary storage apparatus, a NAND flash memory device 220, and a wireless communications circuit 230.

The memory card controller 210, according to commands from the system controller 130 of the digital camera 100 serving as the host apparatus, reads out an image file from or writes an image file to the NAND flash memory device 220 serving as a storage device. Inquiries regarding control, information or the like related to the wireless communications function are controlled with dedicated commands to the memory card controller 210 from the system controller 130 of the digital camera 100 serving as the host apparatus. The memory card controller 210 controls the wireless communications circuit 230 to transmit an image file via wireless communications to an external apparatus such as a PC or a smartphone.

The wireless memory card 200 in the present embodiment is capable of controlling wireless communications independently of control of the digital camera 100. Accordingly, wireless communications with the external apparatus can be performed by control of the wireless memory card 200 itself, without particularly receiving an instruction or the like from the digital camera 100. Of course, commands can be transmitted to or received from the digital camera 100, so the digital camera 100 can also be implemented such that a specific function is controlled from the digital camera 100.

Also, the wireless memory card 200 of the present embodiment stores, in the NAND flash memory device 220, a settings information file where various settings information for performing wireless communications has been written, and wireless communications with the external apparatus are realized by reading out this settings information file. This settings information file can also be recorded in advance at the time of factory shipment or the like, but the wireless memory card 200 of the present embodiment has a function of generating a settings information file based on an instruction from the external apparatus, provided in a case where the wireless memory card 200 has been initialized by format processing. There are mainly two methods for instructing generation of a settings information file. In the first method, the digital camera 100 outputs an instruction to generate a settings information file to the wireless memory card 200 via the memory card interface 142. In the second method, the external apparatus that has established wireless communications via the wireless communications circuit 230 outputs an instruction to generate a settings information file to the wireless memory card 200. As described above, the wireless memory card 200 of the present embodiment is capable of communicating with the external apparatus independently of the digital camera 100, so there are cases where an instruction to generate a settings information file is received from the external apparatus at a time unintended by the digital camera 100. Note that when an instruction to generate a settings information file has been received from the external apparatus, the memory card controller 210 puts the wireless memory card 200 in a write protect state in which writing from the host apparatus (the digital camera 100) is inhibited until the settings information file is generated.

<Processing when Attaching Memory Card>

Figure 2:
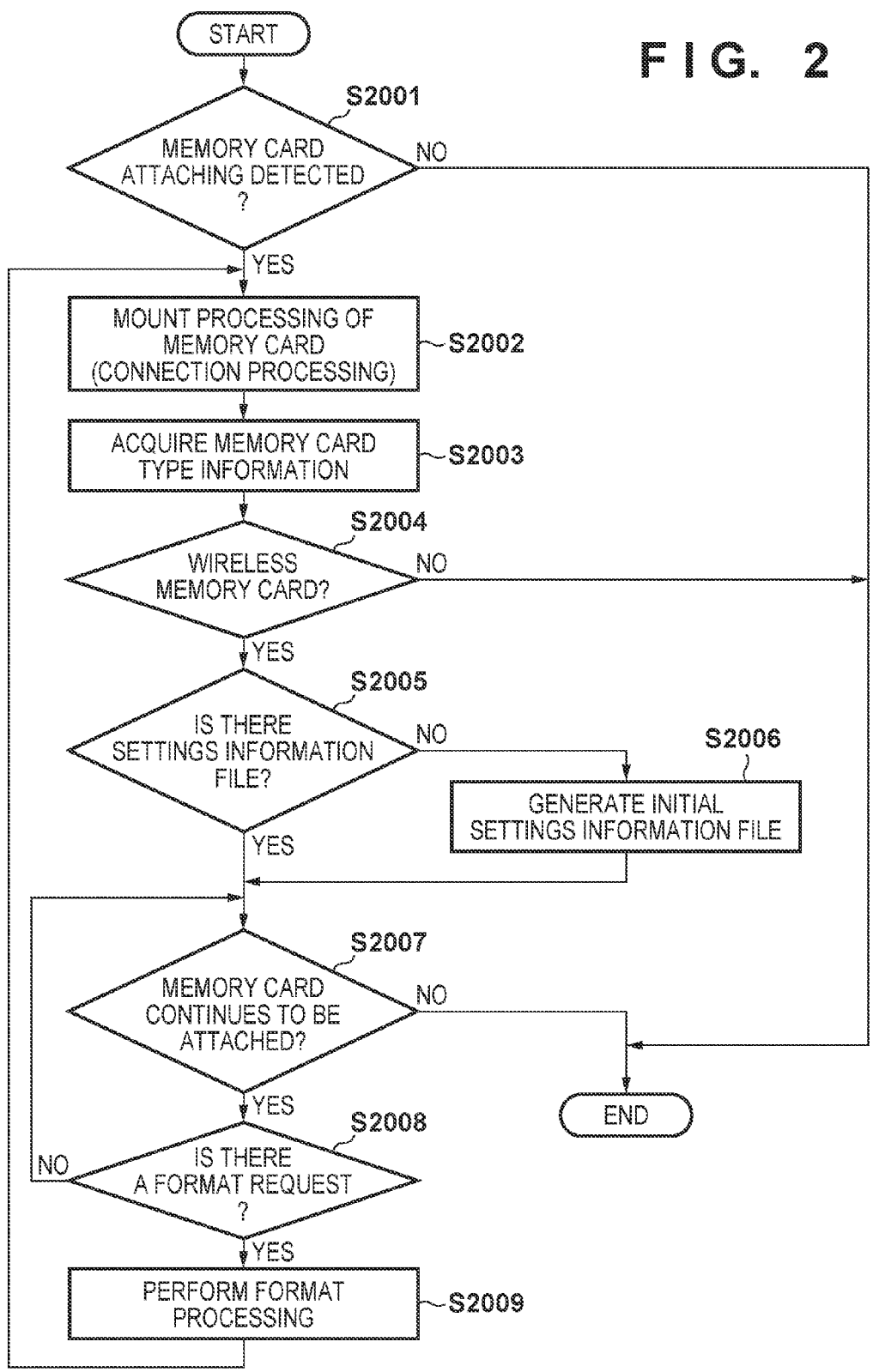
FIG. 2 is a flowchart that shows processing when a memory card is attached in a first embodiment.

Next is a description of processing to generate a settings information file when the wireless memory card 200 has been attached in the digital camera 100 of the first embodiment, with reference to FIG. 2.

In the processing of the present embodiment, in a case where there is not a settings information file in the wireless memory card 200 that has been attached in the card slot, or in a case where the settings information file has been deleted by formatting the wireless memory card 200, the system controller 130 of the digital camera 100 writes a predetermined settings information file being held in the flash memory 180 or the like to the wireless memory card 200. Below is a description of processing in a case where the wireless memory card 200 has been attached in the card slot of the digital camera 100.

The control sequence in FIG. 2 is started when the card detection switch 141 detects attaching of a memory card in the card slot, and is realized by the system controller 130 developing a program that was read out from the flash memory 180 in the RAM 170, and executing that program.

In step S2001, the system controller 130 detects whether a memory card has been attached based on whether the card detection switch 141 of the card slot is switched on or off. When attaching of a memory card has been detected, processing proceeds to step S2002, and when attaching of a memory card has not been detected, processing is ended.

In step S2002, the system controller 130 performs mount processing of the memory card (performs connection processing), and starts supply of electrical power.

In step S2003, the system controller 130 issues a command to acquire card type information to (the memory card controller 210 of) the memory card that has been attached.

In step S2004, the system controller 130 determines whether or not the memory card that has been attached in the card slot is the wireless memory card 200, based on reply information from (the memory card controller 210 of) the memory card. When the result of the determination is that the attached memory card is the wireless memory card 200, processing proceeds to step S2005, and if the result of the determination is that the attached memory card is not the wireless memory card 200, processing is ended.

In step S2005, the system controller 130 determines whether or not there is a settings information file in the wireless memory card 200. When the result of the determination is that a settings information file exists in the wireless memory card 200, processing proceeds to step S2007, and when the result of the determination is that a settings information file does not exist in the wireless memory card 200, processing proceeds to step S2006. Here, the system controller 130 determines whether or not a file having a specific file name (for example, "SETTINGS") exists as the settings information file.

In step S2006, the system controller 130 generates a file of initial settings information as a predetermined settings information file. In a case where the wireless memory card 200 performs wireless communications in a state in which there is no settings information file, generation of a settings information file is requested from the external apparatus. The wireless memory card 200 is put in a write protect state in which writing from the host apparatus is inhibited in order to generate a settings information file. Therefore, such that the wireless memory card 200 is not put in a write protect state by a file generation instruction from the external apparatus at a time unintended by the user, the system controller 130 generates an initial settings information file in advance, and writes this file to the wireless memory card 200. The content of the settings information file is default data of the wireless memory card 200 used as initial settings information. The default data has been stored in the flash memory 180 or the like of the digital camera 100. Note that shooting processing by the digital camera 100, that is, processing to record image data that has been captured by the image capturing unit 150, is inhibited until generation of the settings information file is completed.

In step S2007, the system controller 130 determines from the card detection switch 141 whether or not the wireless memory card 200 continues to be attached in the card slot. When the result of the determination is that the wireless memory card 200 is attached, processing proceeds to step S2008, and when attaching is not detected, processing is ended.

In step S2008, the system controller 130 determines whether or not there is a request to format the wireless memory card 200. When there is a format request, processing proceeds to step S2009, and when there is not a format request, processing returns to step S2007.

In step S2009, the system controller 130 outputs an instruction to the memory card controller 210 to delete the data that is being held by the wireless memory card 200, and performs processing to format the wireless memory card 200. At this time, the settings information file that has been recorded to the wireless memory card 200 is also deleted.

As described above, according to the first embodiment, when a settings information file does not exist in the wireless memory card 200, the digital camera 100 generates a predetermined settings information file and writes this file to the wireless memory card 200. Accordingly, it is possible to reduce the possibility that in a state in which a settings information file does not exist, the wireless memory card 200 performs wireless communications with the external apparatus so that the wireless memory card 200 is put into a write protect state by a file generation instruction from the external apparatus.

Second Embodiment

Figure 3B:
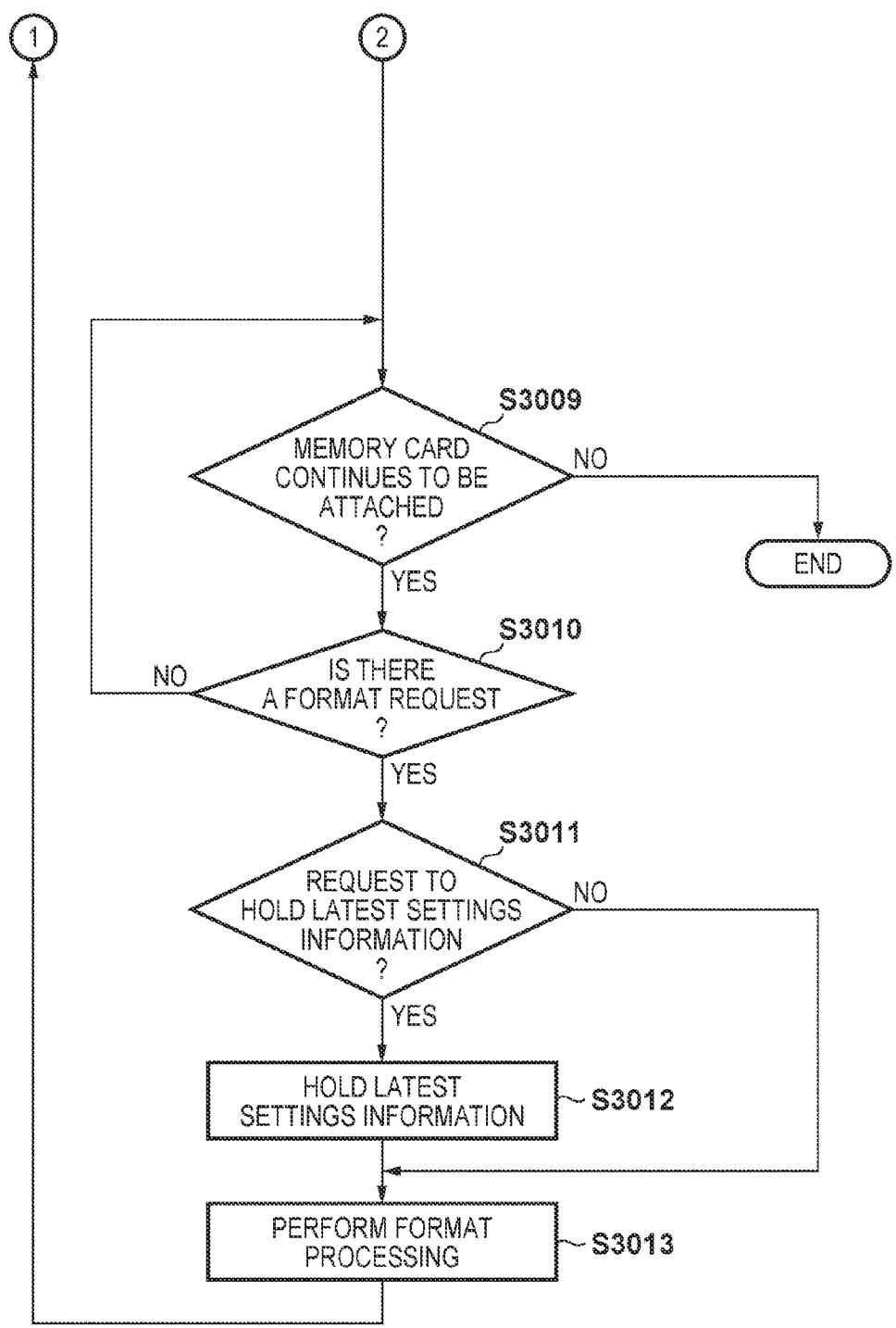
Figure 4:
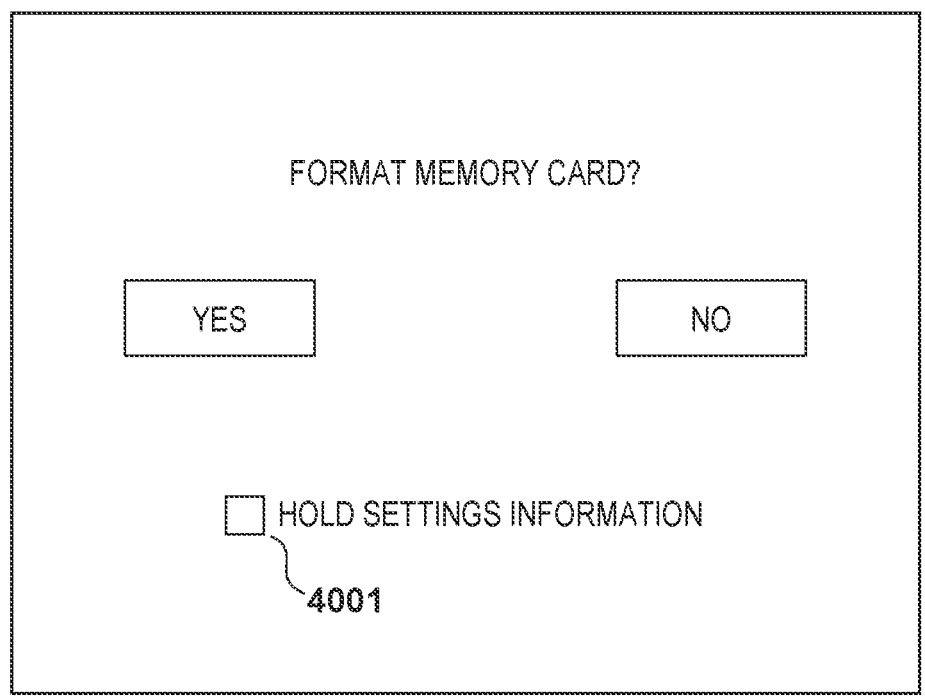
FIG. 4 shows an exemplary settings screen when performing formatting in the second embodiment.

Next is a description of processing to generate a settings information file when the wireless memory card 200 has been attached in the digital camera 100 of a second embodiment, with reference to FIGS. 3 and 4.

In the first embodiment, when a settings information file does not exist in the wireless memory card 200, an initial settings information file used as a predetermined settings information file is generated. However, in the second embodiment, a configuration is adopted in which a user can select to generate an initial settings information file, or to generate a latest settings information file immediately prior to formatting. Note that the configuration of the digital camera and the wireless memory card that realize the second embodiment is the same as in the first embodiment, so a description of them is omitted here.

In FIGS. 3A and 3B, the processing of steps S3001 to S3005, step S3009, step S3010, and step S3013 is the same as the processing of steps S2001 to S2005, step S2007, step S2008, and step S2009 in FIG. 2.

In step S3005, when there is a settings information file in the wireless memory card 200, processing proceeds to step S3009, and when there is not a settings information file in the wireless memory card 200, processing proceeds to step S3006.

In step S3006, the system controller 130 determines whether or not there is a latest settings information file in the flash memory 180 or the like of the digital camera 100. When the result of the determination is that there is a latest settings information file, processing proceeds to step S3007, and when the result of the determination is that there is not a latest settings information file, processing proceeds to step S3008. The 'latest settings information file' means a settings information file that was being stored immediately prior to deleting by format processing described later. Wireless communications information (such as a password) is more likely to have changed in the latest settings information file than in the initial settings information file.

In step S3007, the system controller 130 writes the latest settings information file to the wireless memory card 200.

In step S3008, the system controller 130 writes the initial settings information file to the wireless memory card 200. The initial settings information file is the same as in step S2006 of the first embodiment.

In steps S3009 and S3010, the system controller 130 determines whether or not the wireless memory card 200 continues to be attached, and whether or not there is a format request.

When there is a format request in step S3010, processing proceeds to step S3011, where the system controller 130 determines whether or not there is a request from a user to hold latest settings information. Here, the presence or absence of a request from a user to hold latest settings information will be described with reference to FIG. 4. FIG. 4 shows an exemplary settings screen that the system controller 130 displays in the display unit 110 when formatting the wireless memory card 200. When executing formatting, in a case where the user has entered a check in a checkbox 4001 for 'hold settings information' prior to selecting 'yes' in FIG. 4, a determination is made that there is a request to hold latest settings information and processing proceeds to step S3012, and in a case where a check has not been entered in the checkbox 4001, a determination is made that there is not a request to hold latest settings information and processing proceeds to step S3013.

In step S3012, the system controller 130 stores the latest settings information file in the flash memory 180 or the like.

In step S3013, the system controller 130 performs processing to format the wireless memory card 200, and the settings information file also is deleted.

As described above, according to the second embodiment, after formatting the wireless memory card 200, a user can select to generate an initial settings information file, or to generate a settings information file immediately prior to formatting. Accordingly, the user can arbitrarily select to use initial settings information for wireless communications settings information to write to the wireless memory card 200, or to use changed settings information for that wireless communications settings information.

Third Embodiment

Next is a description of processing to generate a settings information file when the wireless memory card 200 has been attached in the digital camera 100 of a third embodiment, with reference to FIGS. 5 through 7B.

In the second embodiment, a user can select to generate an initial settings information file, or to generate a settings information file immediately prior to formatting. However, in the third embodiment, a settings information file immediately prior to formatting is generated in the case of a simple (quick) format, and an initial settings information file is generated in the case of a complete (ordinary) format. Note that the simple format is processing that deletes information of a memory area without performing an error check of the memory area, and is processing that can be performed more quickly than a complete format. Also, in the present embodiment, a wireless function can be set as valid or invalid from a menu screen when attaching of the wireless memory card 200 has been detected. Note that the configuration of the digital camera and the wireless memory card that realize the second embodiment is the same as in the first embodiment, so a description of them is omitted here.

Figure 5A:
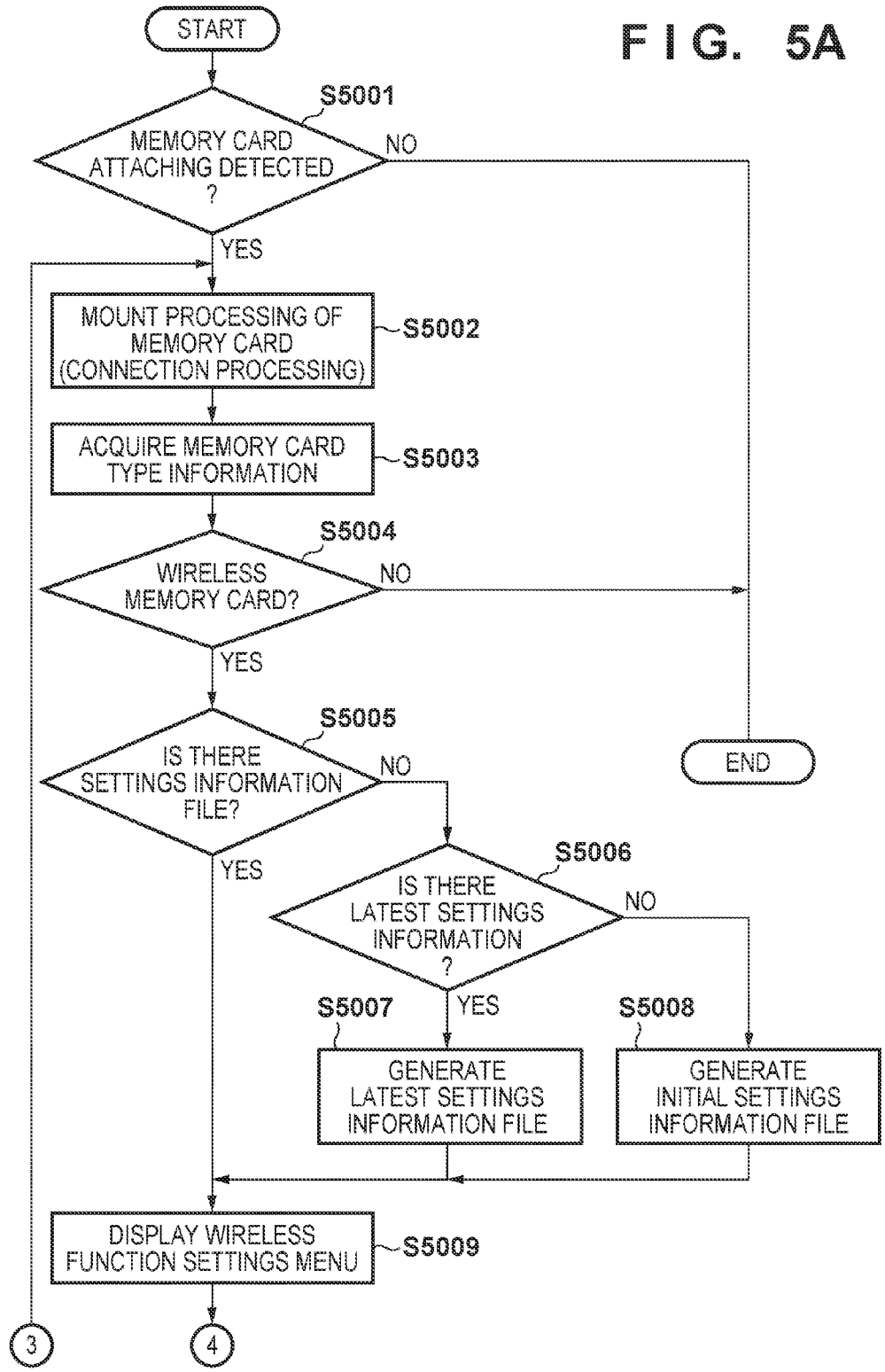

In FIGS. 5A and 5B, the processing of steps S5001 to S5008, step S5010, step S5015, step S5017, and step S5018 is the same as the processing of steps S3001 to S3010, step S3012, and step S3013 in FIGS. 3A and 3B.

Figure 6A:
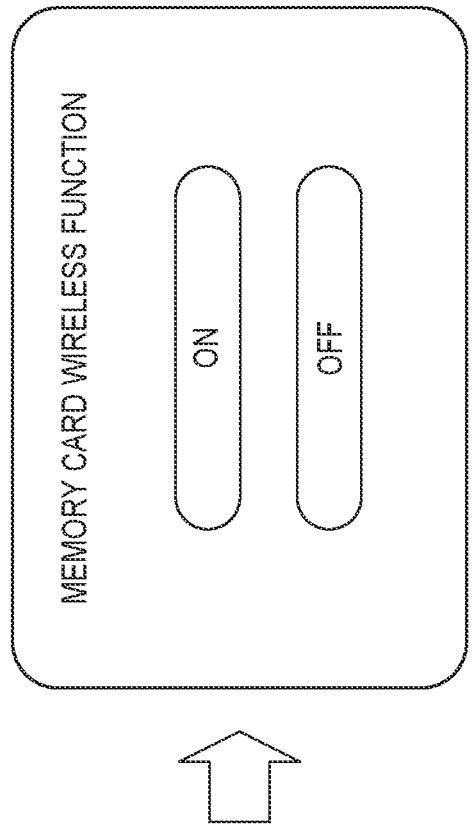
FIGS. 6A and 6B show exemplary settings screens for a wireless function of the memory card of the third embodiment.
Figure 6B:
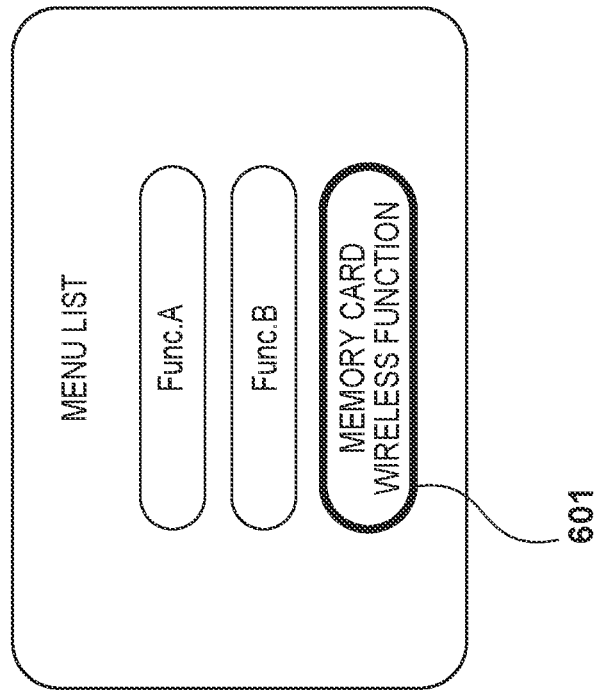

In FIGS. 5A and 5B, in step S5009, the system controller 130 displays a wireless function settings menu. FIGS. 6A and 6B show exemplary menu screens for setting the wireless function, displayed by the system controller 130 in the display unit 110. The system controller 130 displays a menu list as shown in FIG. 6A in the display unit 110. When a 'card wireless function' 601 has been selected in FIG. 6A, a menu as shown in FIG. 6B is displayed in the display unit 110. In the present embodiment, two settings 'ON (valid)' and 'OFF (invalid)' are possible for the wireless function.

Next, in step S5010, when the wireless memory card 200 continues to be attached, processing proceeds to step S5011, where the system controller 130 acquires a connection status of the wireless memory card 200. The system controller 130 issues a command to acquire the connection status to the memory card controller 210.

In step S5012, the system controller 130 determines whether or not the wireless function setting is 'ON' in the acquired connection status. When determined that the setting is 'ON', processing proceeds to step S5013, and when determined that the setting is 'OFF', processing proceeds to step S5014.

In step S5013, the system controller 130 issues a wireless LAN boot request command to the wireless memory card 200. However, when a similar command has already been issued to the wireless memory card 200 at this point in time, it is not necessary to issue the same command again. When the command is issued, the wireless memory card 200 boots the wireless LAN function. Note that the command can be issued after generation of a settings information file is completed in step S5007 or step S5008.

In step S5014, the system controller 130 issues a wireless LAN end request command to the wireless memory card 200. However, when a similar command has already been issued to the wireless memory card 200 at this point in time, it is not necessary to issue the same command again. When the command is issued, the wireless memory card 200 ends the wireless LAN function. Note that the command can be issued after generation of a settings information file is completed in step S5007 or step S5008.

In step S5015, the processing from step S5010 onward is repeated until a format request is received, and when there is a format request processing proceeds to step S5016.

Figure 7A:
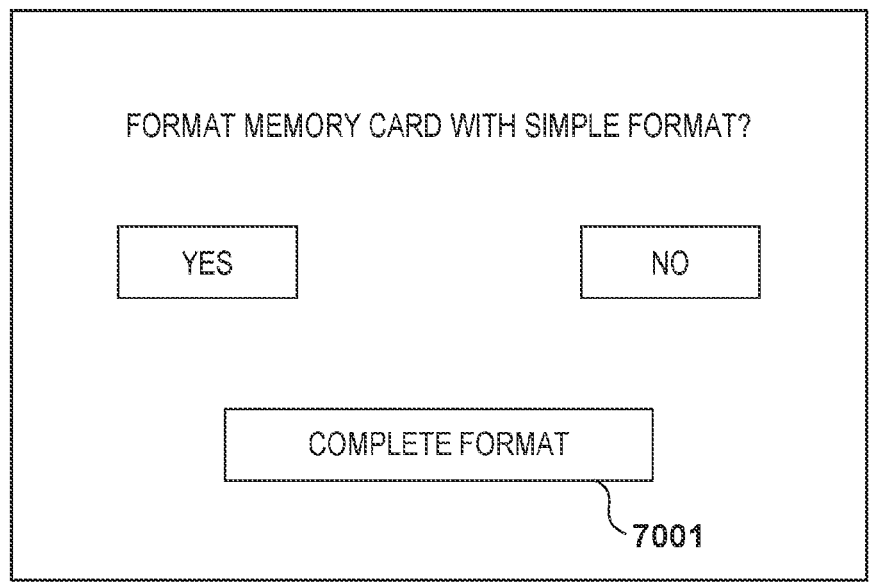
FIGS. 7A and 7B show exemplary menu screens when formatting the memory card of the third embodiment.
Figure 7B:
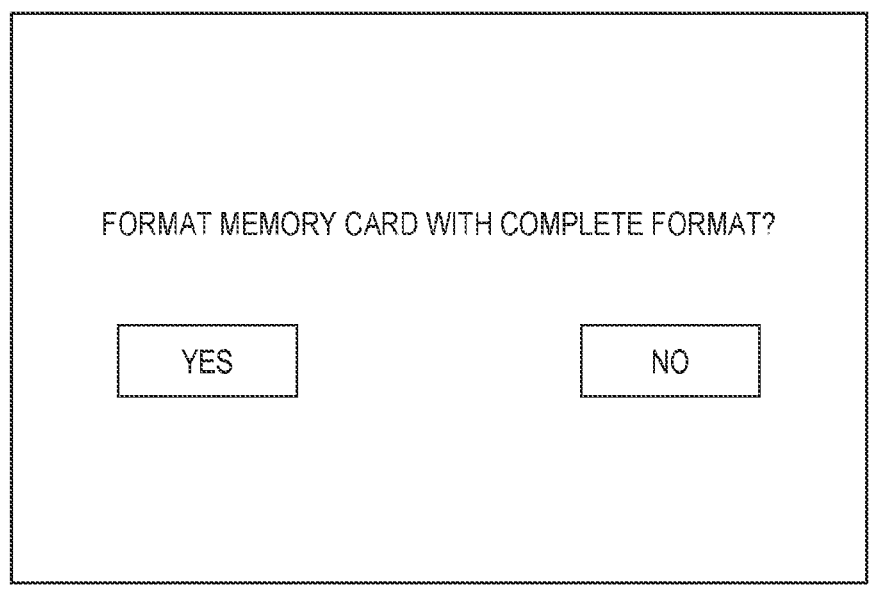

In step S5016, the system controller 130 determines whether or not the format type is 'simple format'. Here, a method for determining the format type will be described with reference to FIGS. 7A and 7B. FIGS. 7A and 7B show exemplary screens displayed by the system controller 130 in the display unit 110 and that are used to set the format type. The system controller 130 displays a format settings menu as shown in FIG. 7A in the display unit 110. When 'complete format' 7001 has been selected in FIG. 7A, a menu for a user to confirm execution of formatting as shown in FIG. 7B is displayed in the display unit 110.

When 'simple format' has been selected in the menu screen in FIG. 7A, processing proceeds to step S5017, and when 'complete format' has been selected, processing proceeds to step S5018.

In step S5017, the system controller 130 stores latest settings information in the flash memory 180 or the like.

In step S5018, the system controller 130 performs processing to format the wireless memory card 200, and the settings information file also is deleted.

As described above, according to the third embodiment, when the format type is a simple format, a settings information file immediately prior to formatting is generated, and when the format type is a complete format, an initial settings information file is generated. Accordingly, the user can select the information settings file to be generated after formatting by merely selecting the format type.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259278, filed Dec. 22, 2014 which is hereby incorporated by reference herein in its entirety.

What is claimed is:

1. A data recording apparatus in which a recording medium is attachable, comprising:

an interface configured to access a recording medium;

a controller configured to execute a detection function, a determination function and a control function by controlling the interface to access the recording medium, wherein:

the detection function is configured to detect whether or not an attached recording medium is a predetermined recording medium having a wireless communications function;

the determination function is configured to determine whether or not, when the attached recording medium is the predetermined recording medium, there is a settings information file where predetermined settings information is written in the predetermined recording medium; and the control function is configured to generate, when determined that the settings information file is not present, a predetermined settings information file in the predetermined recording medium, wherein the predetermined recording medium has a function of generating a settings information file in response to an instruction received wirelessly from an external apparatus, and when generating a settings information file in response to an instruction from the external apparatus, the predetermined recording medium is in a write protect state where writing from the data recording apparatus is inhibited.

2. The apparatus according to claim 1, wherein the controller executes:

a format processing function configured to format the predetermined recording medium; and a selection function allowing selection of a settings information file immediately prior to performing the formatting, or the predetermined settings information file, as the settings information file to be generated by the control function, wherein the control function, when the settings information file immediately prior to performing the formatting is selected, holds the immediately prior settings information file before performing the formatting, and after the formatting is completed, generates the held settings information file in the predetermined recording medium.

3. The apparatus according to claim 2, wherein the format processing function is capable of executing a simple format or a complete format of the predetermined recording medium that has been attached, and the control function, when the complete format was executed, generates the predetermined settings information file in the predetermined recording medium, and when the simple format was executed, generates the immediately prior settings information file.

4. The apparatus according to claim 1, the apparatus further comprising
an image capturing unit,
wherein the controller executes
a recording function configured to record data of an image captured by the image capturing unit to the predetermined recording medium,
wherein the recording function inhibits recording of data of an image captured by the image capturing unit to the predetermined recording medium until generation of the settings information file is completed.

5. The apparatus according to claim 1, wherein the controller further switches the communications function of the predetermined recording medium to a valid state or an invalid state,
wherein the control function sets the communications function of the predetermined recording medium to the invalid state until generation of the settings information file is completed.

6. The apparatus according to claim 1, wherein the predetermined settings information file is an initial settings information file.

7. A control method of a data recording apparatus in which a recording medium is attachable, comprising:
detecting whether or not an attached recording medium is a predetermined recording medium having a wireless communications function;
determining whether or not, when the attached recording medium is the predetermined recording medium, there is a settings information file where predetermined settings information is written in the is the predetermined recording medium; and
generating, when determined that the settings information file is not present, a predetermined settings information file in the predetermined recording medium,
wherein the predetermined recording medium has a function of generating a settings information file in response to an instruction received wirelessly from an external apparatus, and when generating a settings information file in response to an instruction from the external apparatus, the predetermined recording medium is in a write protect state where writing from the data recording apparatus is inhibited.

8. A non-transitory computer-readable storage medium storing a program for causing a computer to execute a control method of a data recording apparatus in which a recording medium is attachable, comprising:
detecting whether or not an attached recording medium is a predetermined recording medium having a wireless communications function;
determining whether or not, when the attached recording medium is the predetermined recording medium, there is a settings information file where predetermined settings information is written in the is the predetermined recording medium; and
generating, when determined that the settings information file is not present, a predetermined settings information file in the predetermined recording medium,
wherein the predetermined recording medium has a function of generating a settings information file in response to an instruction received wirelessly from an external apparatus, and when generating a settings information file in response to an instruction from the external apparatus, the predetermined recording medium is in a write protect state where writing from the data recording apparatus is inhibited.

* * * * *